United States Patent
Wang et al.

(10) Patent No.: US 10,849,110 B2
(45) Date of Patent: Nov. 24, 2020

(54) RESOURCE ALLOCATION FOR THE PHYSICAL UPLINK CONTROL CHANNEL

(71) Applicant: QUALCOMM Incorporated, San Diego, CA (US)

(72) Inventors: Renqiu Wang, San Diego, CA (US); Yi Huang, San Diego, CA (US); Peter Gaal, San Diego, CA (US); WAnshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/274,093

(22) Filed: Feb. 12, 2019

(65) Prior Publication Data

US 2019/0261353 A1   Aug. 22, 2019

Related U.S. Application Data

(60) Provisional application No. 62/710,574, filed on Feb. 16, 2018.

(51) Int. Cl.
*H04L 1/18* (2006.01)
*H04L 5/00* (2006.01)
*H04W 72/04* (2009.01)

(52) U.S. Cl.
CPC ........ *H04W 72/0413* (2013.01); *H04L 1/18* (2013.01); *H04L 5/0026* (2013.01);
(Continued)

(58) Field of Classification Search
None
See application file for complete search history.

(56) References Cited

U.S. PATENT DOCUMENTS

2018/0279283 A1\* 9/2018 Takeda ................. H04W 24/10
2019/0036653 A1\* 1/2019 Lunttila ................ H04L 1/1812
(Continued)

OTHER PUBLICATIONS

CATT: "PUCCH Resource Allocaton," 3GPP Draft; R1-1800256, 3rd Generation Partnership Project (3GPP), Mobile Competence Centre; 650, Route Des Lucioles; F-06921 Sophia-Antipolis Cedex; France, vol. RAN WG1, No. Vancouver, Canada; Jan. 22, 2018-Jan. 26, 2018, Jan. 13, 2018, XP051384734, retrieved from the Internet: URL: http://www.3gpp.org/ftp/tsg%5Fran/WG1%5FRL1/TSGR1%5FAH/NR%5FAH%6F1801/Docs/ retrieved on Jan. 13, 2018 section 2.4; p. 4.

(Continued)

*Primary Examiner* — Ajit Patel
(74) *Attorney, Agent, or Firm* — Kevin M. Donnelly

(57) ABSTRACT

Aspects of the disclosure relate to allocating resources for a physical uplink control channel (PUCCH). In a first example, a subset of a resource set corresponding to a PUCCH is identified based on an explicit mapping of acknowledgment resource indicator (ARI) values, and a resource index corresponding to a resource within the subset is derived based on an implicit mapping of the resource index. A PUCCH communication is then transmitted via the resource. In another example, a user equipment (UE) is configured to ascertain resources for a PUCCH in accordance with an explicit mapping of ARI values and an implicit mapping of a resource index such that the explicit mapping facilitates an identification of a subset of a resource set, whereas the implicit mapping facilitates a derivation of the resource index to identify a corresponding resource within the subset.

16 Claims, 10 Drawing Sheets

(52) U.S. Cl.
CPC .......... *H04L 5/0055* (2013.01); *H04L 5/0094* (2013.01); *H04W 72/042* (2013.01); *H04L 5/001* (2013.01)

(56) References Cited

U.S. PATENT DOCUMENTS

| | | | |
|---|---|---|---|
| 2019/0230642 A1* | 7/2019 | Baldemair | H04L 1/1614 |
| 2019/0342864 A1* | 11/2019 | Hwang | H04W 88/02 |
| 2019/0349942 A1* | 11/2019 | Li | H04L 5/0055 |

OTHER PUBLICATIONS

Huawei, et al: "Remaining Issues and TP on Resource Allocation for PUCCH," 3GPP Draft; R1-1800828, 3rd Generation Partnership Project (3GPP), Mobile Competence Centre; 650, Route Des Lucioles; F-06921 Sophia-Antipolis Cedex; France, vol. RAN WG1, No. Vancouver, Canada; Jan. 22, 2018-Jan. 26, 2018, Jan. 13, 2018, XP051385100, Retrieved from the Internet: URL: http://www.3gpp.org/ftp/tsg%5Fran/WG1%5FRL1/TSGR1%5FAH/NR%5FAH%5F1801/Docs/ [retrieved on Jan. 13, 2018] section 2.1-2.2; p. 1-p. 2, p. 3-p. 4; table 2.

International Search Report and Written Opinion—PCT/US2019/017875—ISA/EPO—dated Apr. 24, 2019.

* cited by examiner

RESOURCE ALLOCATION FOR THE PHYSICAL UPLINK CONTROL CHANNEL

CROSS-REFERENCE TO RELATED APPLICATIONS

The application claims priority to and the benefit of U.S. provisional patent application No. 62/710,574 filed on Feb. 16, 2018, the entire content of which is incorporated herein by reference as if fully set forth below in its entirety and for all applicable purposes.

TECHNICAL FIELD

The technology discussed below relates generally to wireless communication systems, and more particularly, to allocating resources for the physical uplink control channel (PUCCH).

INTRODUCTION

As the demand for mobile broadband access continues to increase, research and development continue to advance wireless communication technologies not only to meet the growing demand for mobile broadband access, but to advance and enhance the user experience with mobile communications. Advances in 5G New Radio (NR) in particular have been made so as to provide end users with a more efficient network. Such advances, however, often present new design considerations. For instance, with respect to allocating resources in NR for the physical uplink control channel (PUCCH), it should be noted that various agreements have been made. Despite these agreements, however, various remaining issues related to PUCCH resource allocation have not yet been agreed upon.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects directed towards a scheduled entity (e.g., a user equipment (UE)) are disclosed. In a particular example, a method is disclosed, which may include identifying a subset of a resource set corresponding to a physical uplink control channel (PUCCH). Here, such identifying may be based on an explicit mapping of acknowledgment resource indicator (ARI) values to a plurality of different remaining minimum system information (RMSI) values. The method may also include deriving a resource index corresponding to a resource within the subset. Here, such deriving may be based on an implicit mapping of the resource index to at least one of a control channel element (CCE) index or a resource block group (RBG) index. The method may then also include transmitting a PUCCH communication via the resource.

In another aspect, a scheduled entity is disclosed. The scheduled entity can include a processor communicatively coupled to each of an explicit mapping circuitry an implicit mapping circuitry, and a transmitting circuitry. For this example, the explicit mapping circuitry can be configured to identify a subset of a resource set corresponding to a PUCCH. For this example, the explicit mapping circuitry may be configured to identify the subset based on an explicit mapping of ARI values to a plurality of different RMSI values. The implicit mapping circuitry can be configured to derive a resource index corresponding to a resource within the subset based on an implicit mapping of the resource index to at least one of a CCE index or an RBG index. The transmitting circuitry may then be configured to transmit a PUCCH communication via the resource.

Various aspects directed towards a scheduling entity (e.g., a base station) are also disclosed. In a particular example, a method is disclosed, which may include mapping ARI values to a plurality of different RMSI values, and mapping a resource index to at least one of a CCE index or an RBG index. The method may further include configuring at least one UE to ascertain resources for a PUCCH in accordance with an explicit mapping and an implicit mapping. Here, the explicit mapping may facilitate an identification of a subset of a resource set based on the mapping of ARI values, whereas the implicit mapping may facilitate a derivation of the resource index to identify a corresponding resource within the subset.

In another aspect, a scheduling entity is disclosed. A scheduling entity can include a processor communicatively coupled to each of an ARI circuitry, a resource index circuitry, and a resource allocation circuitry. For this example, the ARI circuitry can be configured to map ARI values to a plurality of different RMSI values, whereas the resource index circuitry may be configured to map a resource index to at least one of a CCE index or an RBG index. The resource allocation circuitry can be configured to configure at least one UE to ascertain resources for a PUCCH in accordance with an explicit mapping and an implicit mapping. For this example, the explicit mapping may facilitate an identification of a subset of a resource set based on the mapping of ARI values, whereas the implicit mapping may facilitate a derivation of the resource index to identify a corresponding resource within the subset.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
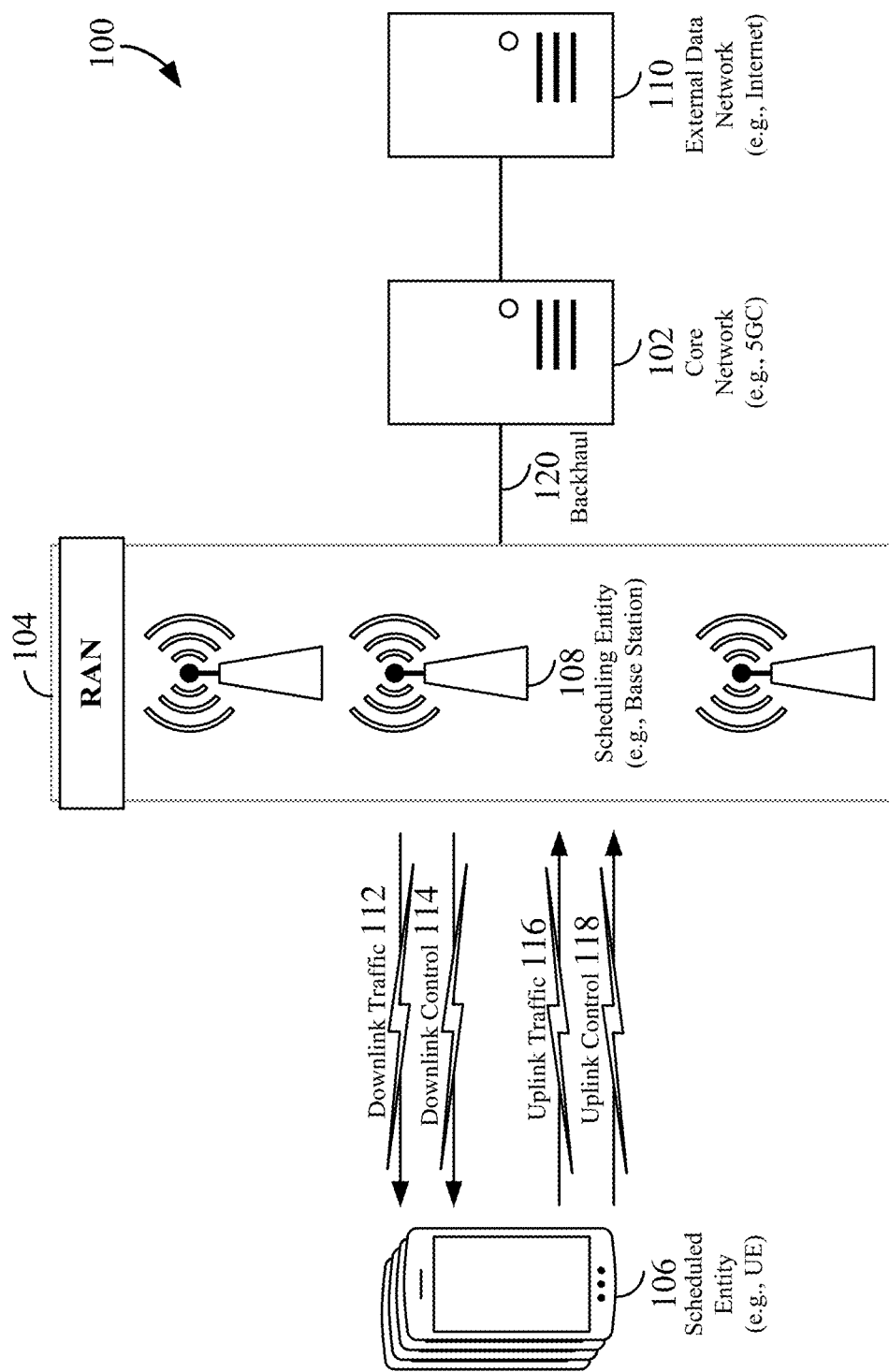
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

As previously stated, various industry-wide agreements have been made with respect to allocating resources for the physical uplink control channel (PUCCH). For instance, particular agreements have been made with respect to resource allocation for HARQ-ACK before radio resource control (RRC) connection setup. Such agreements include, for example: (1) having a 4-bit remaining minimum system information (RMSI) indicate an entry into a 16-row table, wherein each row in the table configures a set of cell-specific PUCCH resources/parameters; (2) a PUCCH duration of at least {2, 14}; and (3) if frequency hopping is enabled for long PUCCH, the physical resource blocks (PRBs) of the two hops are x PRBs away from each edge of the initial uplink (UL) bandwidth part (BWP). Other agreements include, (1) for PUCCH duration=2, having the starting symbol be symbol 12 within the slot, and (2) setting HARQ-ACK to be only one bit without bundling before RRC connection.

Aspects disclosed herein are directed towards various remaining issues related to PUCCH resource allocation that have not yet been agreed upon. For instance, particular aspects are disclosed with respect to allocating PUCCH resources before RRC connection setup based on at least one of various mappings.

Definitions

RAT: radio access technology. The type of technology or communication standard utilized for radio access and communication over a wireless air interface. Just a few examples of RATs include GSM, UTRA, E-UTRA (LTE), Bluetooth, and Wi-Fi.

NR: new radio. Generally refers to 5G technologies and the new radio access technology undergoing definition and standardization by 3GPP in Release 15.

OFDM: orthogonal frequency division multiplexing. An air interface may be defined according to a two-dimensional grid of resource elements, defined by separation of resources in frequency by defining a set of closely spaced frequency tones or subcarriers, and separation in time by defining a sequence of symbols having a given duration. By setting the spacing between the tones based on the symbol rate, inter-symbol interference can be eliminated. OFDM channels provide for high data rates by allocating a data stream in a parallel manner across multiple subcarriers.

CP: cyclic prefix. A multipath environment degrades the orthogonality between subcarriers because symbols received from reflected or delayed paths may overlap into the following symbol. A CP addresses this problem by copying the tail of each symbol and pasting it onto the front of the OFDM symbol. In this way, any multipath components from a previous symbol fall within the effective guard time at the start of each symbol, and can be discarded.

Scalable numerology: in OFDM, to maintain orthogonality of the subcarriers or tones, the subcarrier spacing is equal to the inverse of the symbol period. A scalable numerology refers to the capability of the network to select different subcarrier spacings, and accordingly, with each spacing, to select the corresponding symbol period. The symbol period should be short enough that the channel does not significantly vary over each period, in order to preserve orthogonality and limit inter-subcarrier interference.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
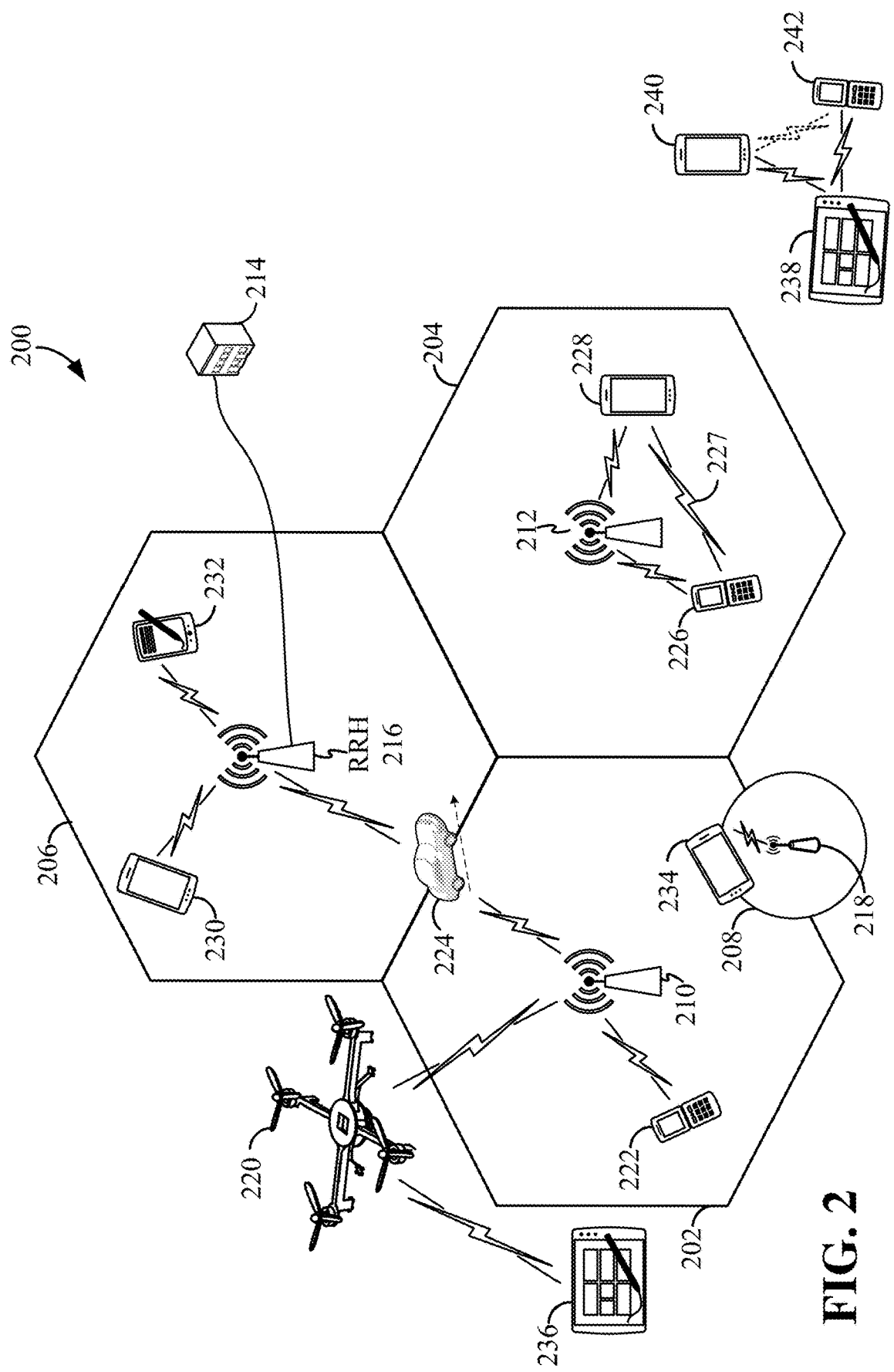
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Figure 3:
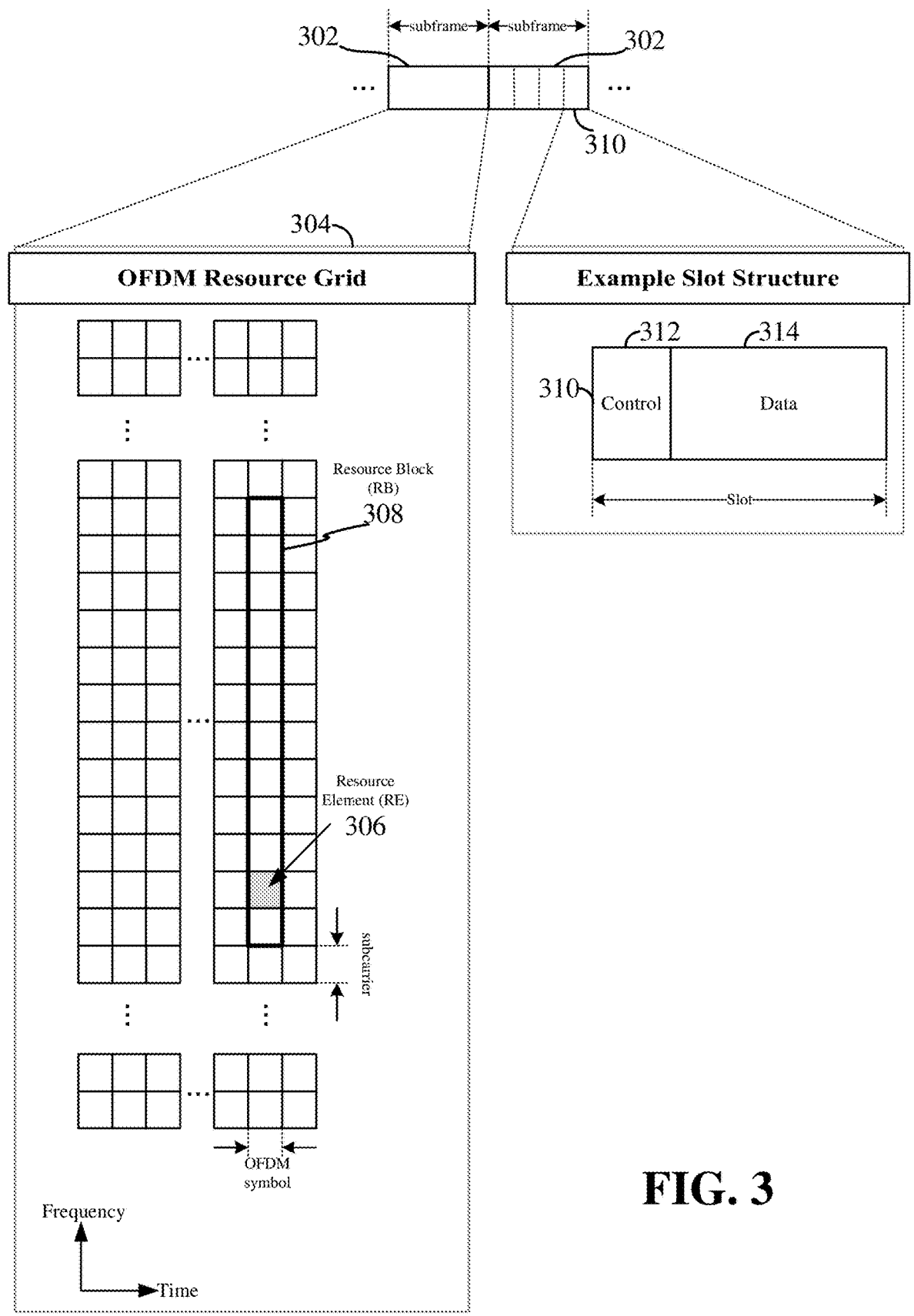
FIG. 3 is a schematic illustration of an organization of wireless resources in an air interface utilizing orthogonal frequency divisional multiplexing (OFDM).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information 114 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 306 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

The channels or carriers described above and illustrated in FIGS. 1 and 3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 4:
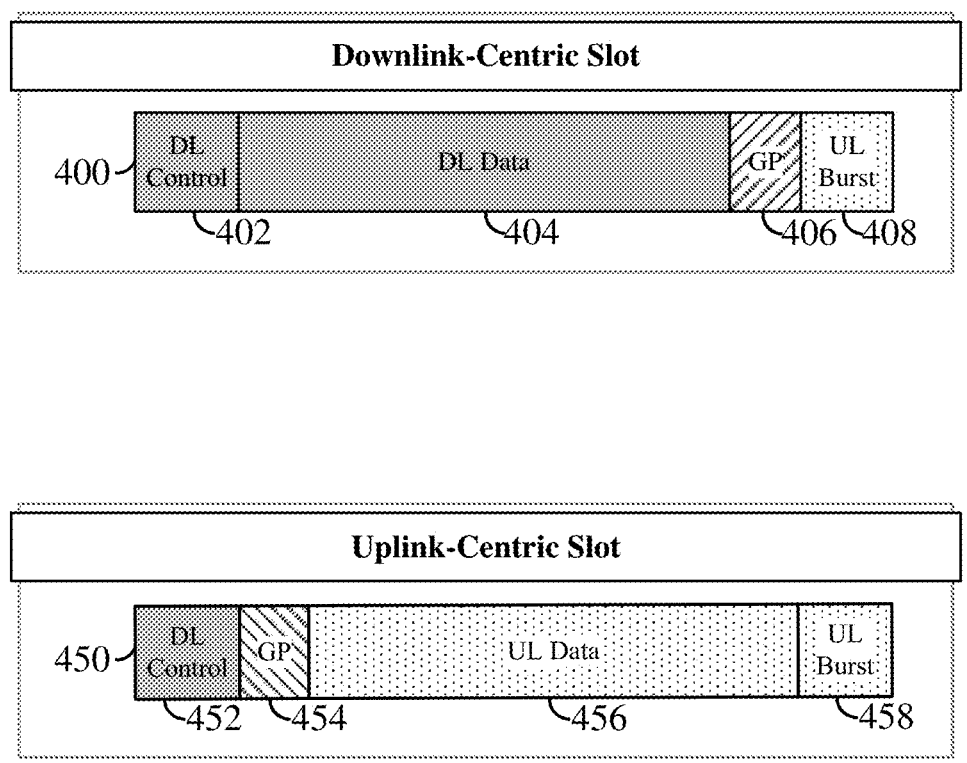
FIG. 4 is a schematic illustration of exemplary self-contained slots according to some aspects of the disclosure.

According to an aspect of the disclosure, one or more slots may be structured as self-contained slots. For example, FIG. 4 illustrates two example structures of self-contained slots 400 and 450. The self-contained slots 400 and/or 450 may be used, in some examples, in place of the slot 310 described above and illustrated in FIG. 3.

In the illustrated example, a DL-centric slot 400 may be a transmitter-scheduled slot. The nomenclature DL-centric generally refers to a structure wherein more resources are allocated for transmissions in the DL direction (e.g., transmissions from the scheduling entity 108 to the scheduled entity 106). Similarly, an UL-centric slot 450 may be a receiver-scheduled slot, wherein more resources are allocated for transmissions in the UL direction (e.g., transmissions from the scheduled entity 106 to the scheduling entity 108).

Each slot, such as the self-contained slots 400 and 450, may include transmit (Tx) and receive (Rx) portions. For example, in the DL-centric slot 400, the scheduling entity 202 first has an opportunity to transmit control information, e.g., on a PDCCH, in a DL control region 402, and then an opportunity to transmit DL user data or traffic, e.g., on a PDSCH in a DL data region 404. Following a guard period (GP) region 406 having a suitable duration 410, the scheduling entity 108 has an opportunity to receive UL data and/or UL feedback including any UL scheduling requests, CSF, a HARQ ACK/NACK, etc., in an UL burst 408 from other entities using the carrier. Here, a slot such as the DL-centric slot 400 may be referred to as a self-contained slot when all of the data carried in the data region 404 is scheduled in the control region 402 of the same slot; and further, when all of the data carried in the data region 404 is acknowledged (or at least has an opportunity to be acknowledged) in the UL burst 408 of the same slot. In this way, each self-contained slot may be considered a self-contained entity, not necessarily requiring any other slot to complete a scheduling-transmission-acknowledgment cycle for any given packet.

The GP region 406 may be included to accommodate variability in UL and DL timing. For example, latencies due to radio frequency (RF) antenna direction switching (e.g., from DL to UL) and transmission path latencies may cause the scheduled entity 204 to transmit early on the UL to match DL timing. Such early transmission may interfere with symbols received from the scheduling entity 108. Accordingly, the GP region 406 may allow an amount of time after the DL data region 404 to prevent interference, where the GP region 406 provides an appropriate amount of time for the scheduling entity 108 to switch its RF antenna direction, an appropriate amount of time for the over-the-air (OTA) transmission, and an appropriate amount of time for ACK processing by the scheduled entity.

Similarly, the UL-centric slot 450 may be configured as a self-contained slot. The UL-centric slot 450 is substantially similar to the DL-centric slot 400, including a guard period 454, an UL data region 456, and an UL burst region 458.

The slot structure illustrated in slots 400 and 450 is merely one example of self-contained slots. Other examples may include a common DL portion at the beginning of every slot, and a common UL portion at the end of every slot, with various differences in the structure of the slot between these respective portions. Other examples still may be provided within the scope of the present disclosure.

In OFDM, to maintain orthogonality of the subcarriers or tones, the subcarrier spacing may be equal to the inverse of the symbol period. A numerology of an OFDM waveform refers to its particular subcarrier spacing and cyclic prefix (CP) overhead. A scalable numerology refers to the capability of the network to select different subcarrier spacings, and accordingly, with each spacing, to select the corresponding symbol duration, including the CP length. With a scalable numerology, a nominal subcarrier spacing (SCS) may be scaled upward or downward by integer multiples. In this manner, regardless of CP overhead and the selected SCS, symbol boundaries may be aligned at certain common multiples of symbols (e.g., aligned at the boundaries of each 1 ms subframe). The range of SCS may include any suitable SCS. For example, a scalable numerology may support a SCS ranging from 15 kHz to 480 kHz.

Figure 5:
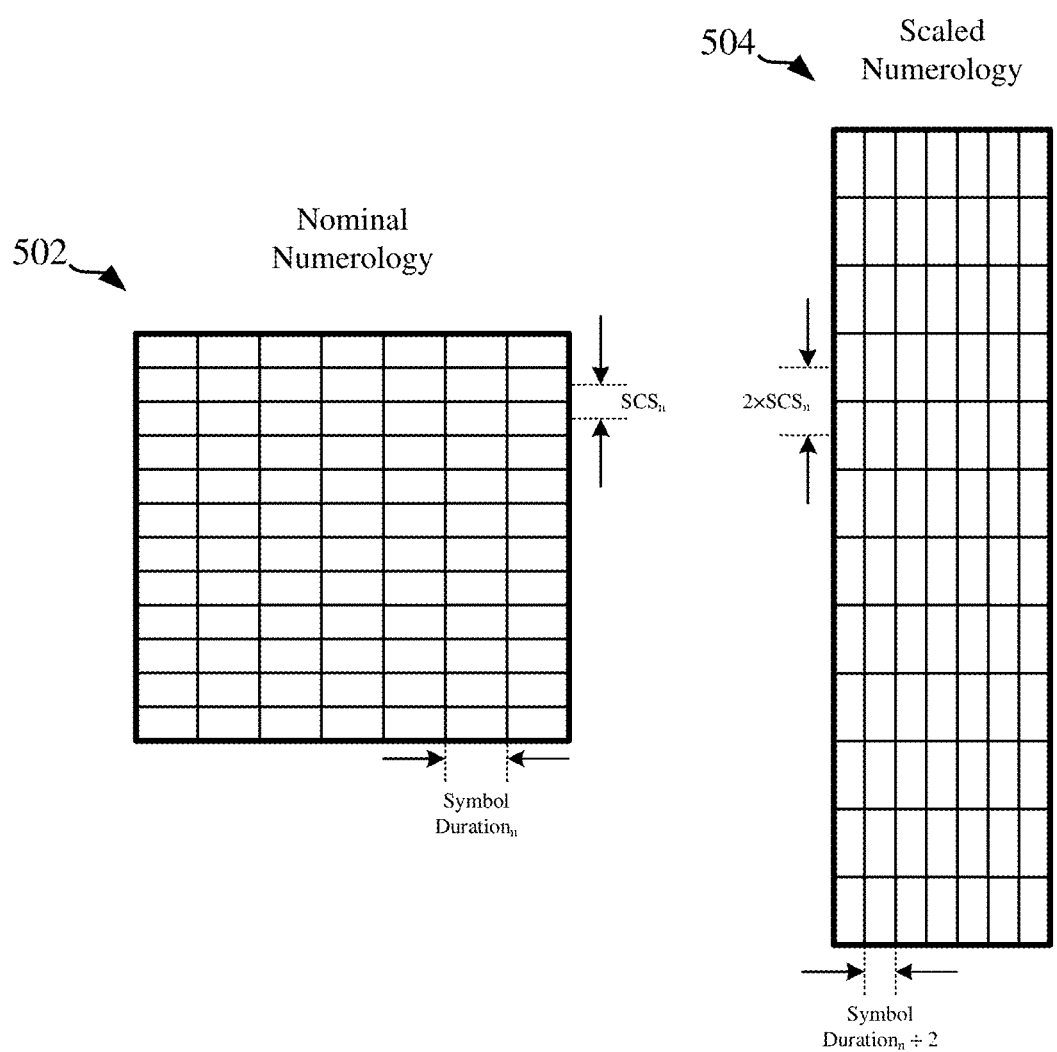
FIG. 5 is a schematic illustration of an OFDM air interface utilizing a scalable numerology according to some aspects of the disclosure.

To illustrate this concept of a scalable numerology, FIG. 5 shows a first RB 502 having a nominal numerology, and a second RB 504 having a scaled numerology. As one example, the first RB 502 may have a 'nominal' subcarrier spacing ($SCS_n$) of 30 kHz, and a 'nominal' symbol duration$_n$ of 333 µs. Here, in the second RB 504, the scaled numerology includes a scaled SCS of double the nominal SCS, or $2 \times SCS_n = 60$ kHz. Because this provides twice the bandwidth per symbol, it results in a shortened symbol duration to carry the same information. Thus, in the second RB 504, the scaled numerology includes a scaled symbol duration of half the nominal symbol duration, or (symbol duration$_n$)÷2=167 µs.

PUCCH Resource Allocation after RRC Connection Setup

When allocating resources for the physical uplink control channel (PUCCH) after a radio resource control (RRC) connection setup, it should be noted that various agreements have been reached, including particular agreements for frameworks that include explicit signaling and implicit mapping. For instance, a particular agreement was reached in which an x-bit acknowledgment resource indicator (ARI), e.g., where x=2 bits or 3 bits, is jointly included with implicit mapping for PUCCH resource allocation. For such framework, it was agreed that: (1) the number of PUCCH resources that may be configured in a resource set can be greater than 4, but no more than y (e.g., where y=8, 16, or 32); (2) the number of PUCCH resources in a resource set is configured, wherein explicit signaling and implicit mapping are used when the number of PUCCH resources in a resource set is greater than 4; (3) a subset within a resource set is indicated by the ARI and implicit mapping is used within the subset; and (4) if no additional RRC resources are necessary, an x-bit ARI with up to y resources per resource set may be supported. An agreement has also been reached with respect to allocating PUCCH resources via fallback downlink control information (DCI) in a manner that is substantially similar to the procedure for allocating resources via normal DCI.

According to these agreements, the x ARI bits in DCI will indicate a particular subset while implicit mapping will determine a resource index in the selected subset. To minimize PUCCH resource collision, the gNB may attempt to assign UEs into subsets with non-overlapping physical resources. In that way, no matter where the physical downlink control channel (PDCCH) is transmitted, the selected physical resources for the two UEs will be different. When the gNB cannot avoid assigning two UEs to two sub-sets that include at least one identical physical resource, a collision may occur, wherein implicit mapping is used to select one of the resources in the selected resource set. Here, it should be appreciated that at least the following five options have been considered: Option 1—Implicit indication is based on the control channel element (CCE) index; Option 2—Implicit indication is based on the resource block group (RBG) index; Option 3—Implicit indication is based on the transmit power control (TPC); Option 4—No implicit indication, and the number of ARI bits x is increased (e.g., from 2 bits to 3 bits); and Option 5—Option 1 or 2 for PUCCH format 0/1, and no implicit indication for other PUCCH formats.

For Option 1, the gNB may place the PDCCHs at particular locations. Such locations (with corresponding starting CCE indices) may be mapped to a particular relative resource index within the resource subset. For instance, a mapping function may be used to determine the relative resource index by checking whether the starting CCE index is even or odd. Such mapping, however, does not work for aggregation levels greater than 1 because the starting CCE index will always be even. To solve this issue, the starting CCE index may be normalized by the aggregation level. For instance, if M represents the number of resources within the selected resource subset, C represents the starting CCE index of the PDCCH, and L represents the aggregation level, the relative resource index within the selected subset r maybe calculated as:

$$r = \left(\frac{C}{L}\right) \% M$$

Referring next to Tables 1-3, an exemplary configuration of resources is provided, wherein the global resource index is a virtual concept denoting a unique physical resource in the system. In an RRC configuration table, it should be appreciated that the global resource index may be translated into a detailed resource definition as in Table 1. As illustrated in Tables 2 and 3, two of the physical resources are identical. In Table 1, exemplary PDCCH information is provided for a particular slot when both UE A and UE B are active, wherein such PDCCH information may include the corresponding ARI value/subset index, starting CCE index, aggregation level, relative resource index and the final global resource index. As shown, for this example, the two UEs are assigned to two subsets that include one identical physical resource, but are then assigned different physical resources after implicit mapping. However, if the starting CCE of UE A happens to be 4, then UE A will actually be assigned to physical resource 11 as well leading to a collision. Therefore, this combination of explicit signaling and implicit mapping will not fully eliminate collisions, but it will significantly reduce the collision rate because the number of configured resources per UE may be increased without increasing DCI overhead and the gNB may choose to place a PDCCH at a particular CCE index to minimize the collision rate.

TABLE 1

PDCCH information

| | ARI value/subset index | Starting CCE | Aggregation level | Relative resource index in subset | Assigned global resource index |
|---|---|---|---|---|---|
| UE A | 1 | 8 | 4 | 0 | 23 |
| UE B | 3 | 24 | 2 | 0 | 11 |

TABLE 2

Configured resources for UE A

| subset | Relative resource index | Global resource index |
|---|---|---|
| 0 | 0 | 53 |
|   | 1 | 25 |
| 1 | 0 | 23 |
|   | 1 | 11 |
| 2 | 0 | 62 |
|   | 1 | 44 |
| 3 | 0 | 13 |
|   | 1 | 47 |

TABLE 3

Configured resources for UE B

| subset | Relative resource index | Global resource index |
|---|---|---|
| 0 | 0 | 62 |
|   | 1 | 49 |
| 1 | 0 | 10 |
|   | 1 | 15 |
| 2 | 0 | 20 |
|   | 1 | 38 |
| 3 | 0 | 11 |
|   | 1 | 6 |

Figure 6:
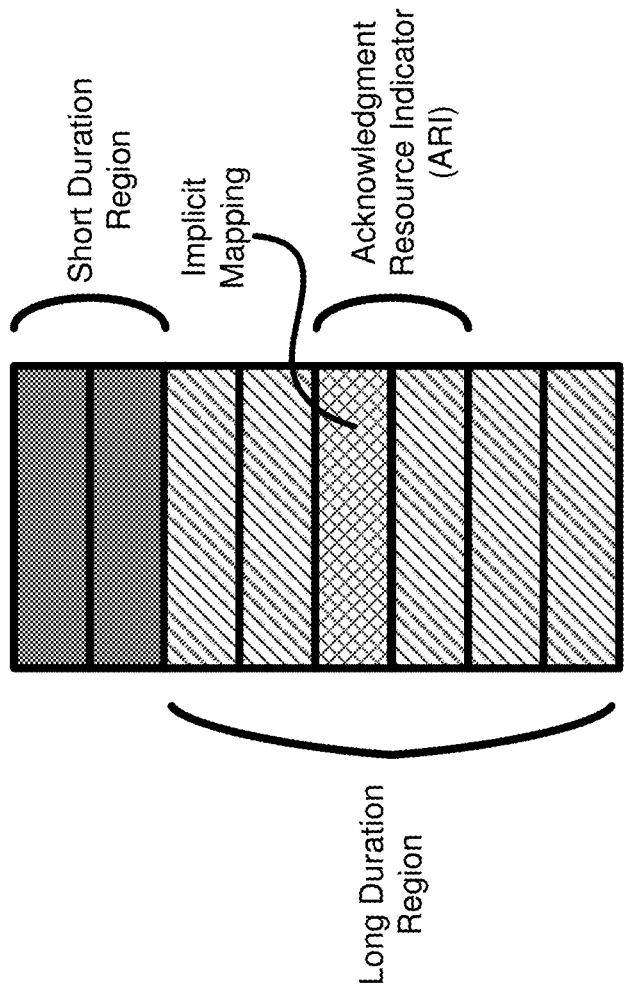
FIG. 6 illustrates an exemplary selection of a resource subset via acknowledgment resource indicator (ARI) bits according to some aspects of the disclosure.

In some cases, it is contemplated that an eNB may configure PUCCH resources for a particular UE in either short or long durations. In that case, the UE is configured semi-statically on either the short PUCCH or the long PUCCH (i.e., the UE in this case cannot dynamically switch between short PUCCH and long PUCCH). On the other hand, if a UE is configured with some PUCCH resources in short duration and other resources in long duration, the UE may be dynamically configured in either short or long duration indicated by the ARI bits. For example, as illustrated in FIG. 6, a UE may be RRC configured with eight resources, wherein two resources are configured in the short duration region and six resources are configured in the long duration region. For this example, two ARI bits are also contemplated, as shown. It is further contemplated that the eight resources are divided into four resources subsets, wherein one subset resides in the short duration region, and three subsets reside in the long duration region. As disclosed herein, the ARI bits may then be used to select one of the subsets, which enables the UE to know whether a short PUCCH or long PUCCH format will be used. Implicit mapping may then be used to obtain one of the two resources in the subset. Moreover, as disclosed herein, it is contemplated that ARI bits may be used to indicate short or long duration in a resource set, wherein the resources subset indicated by the ARI bits may include resources in either short or long duration, but not both.

In another aspect disclosed herein, it is contemplated that the ARI bits may be used to indicate separate resource sets corresponding to different UE identifiers in MU-MIMO, a different k1 value in cross-slot scheduling, a different carrier index, etc. In cases where there is cross-slot scheduling and or carrier-aggregation (e.g., when there are multiple PDCCH/PDSCH mapped to a single PUCCH, the starting CCE index of the most recent PDCCH may be used). If there are multiple component carriers (CCs) in the most recent PDCCH slots, the starting CCE index of the PDCCH with the minimum CC index may be used. It should also be noted that when a UE misses the last PDCCH (or in the carrier aggregation (CA) case, the UE misses the correct CC), the UE may use the wrong resource index, although the probability of missing a single PDCCH is small (approximately 1%), and the probability of missing multiple PDCCHs are even smaller. Therefore, the benefits of implicit mapping often make such loss more acceptable.

Referring back to the remaining options listed above, it is noted that the implicit mapping in Option 2 may be based on the starting RBG index of the corresponding physical downlink shared channel (PDSCH). For example, if two resources per resource subset is assumed, an even RBG index may indicate the first resource in the resource subset, whereas an odd RGB index may indicate the second resource. A benefit of using PDSCH that corresponds to the starting RBG index is that it may be easier for the gNB to arrange the RBG index of the PDSCH cross slots and cross CCs so that the all PDSCHs corresponding to the same ACK transmission can have either all even or all odd RBG indices. This way, they can desirably be mapped to the same PUCCH resource, even if the last PDCCH was not decoded successfully.

Next, with respect to the TPC command from which Option 3 is based, it should be noted that two bits are currently allocated. It should be further noted that the upper two values {−1, 0} may be used to indicate one resource in the resource subset and use the lower two values {1, 3} to indicate the other resource. A benefit of the Option 3 is that the gNB can readily set the TPC command to indicate the same resource cross slots or cross CCs. Therefore, even if the UE misses the last PDCCH, it can still get the correct PUCCH resource. However, Option 3 may also undesirably reduce the power control resolution. For example, the UE may be powered up by setting the TPC command to three in order to meet the performance requirement. In order to maintain the same PUCCH resource mapping though, the gNB may need to set the TPC command to zero, which will undesirably lead to performance degradation of the PUCCH channel.

Referring next to Option 4, which is based on pure explicit signaling with 3-ARI bits, several undesirable characteristics are also noted. For instance, in addition to not confirming with the aforementioned agreements in the industry, a pure explicit signaling scheme may also undesirably miss PDCCH. In a cross-slot scheduling case, for example, the ARI bits may be set to different values corresponding to the different resource subset in the resource set, wherein missing the last one or more PDCCHs may lead to resource confusion between UE and gNB. Even if the gNB configures the ARI bits to select the same resource subset, as the number of ACK bits increase, the PUCCH format and/or the resource set may actually change. Therefore, the problem with missing the last one or more PDCCHs remains an issue with the pure explicit signaling approach in Option 4.

With Option 5, a combined explicit signaling and implicit mapping approach is limited to a particular 0/1 format. For all other formats, Option 5 uses only explicit signaling with an x-bit ARI. This option offers a tradeoff between a pure explicit signaling approach and an approach that combines explicit signaling and implicit mapping. However, this may not be necessary if the gNB is relied upon for implementation. Indeed, a gNB has full control of whether implicit mapping is enabled since it controls the number of resources in the resource set. If the gNB wants to disable implicit mapping for a particular UE, it can always configure four or less resources in the resource set.

As disclosed herein, it is thus contemplated that a resource index r corresponding to a resource subset may be implicitly derived. For instance, in a first contemplated option, a mapping is performed from the starting CCE index according to the following equation:

$$r = \text{Mod}\left(\frac{C}{L}, M\right)$$

wherein,

M is the number of PUCCH resources in the resource subset indicated by ARI bits;

C is the starting CCE index of the last DCI received within the ACK bundling window (NOTE: In the case of CA, C is the starting CCE index of the DCI received on the smallest CC in the last slot within the ACK bundling window); and L is the aggregation level of the PDCCH associated with C.

In a second contemplated option, however, a mapping is performed from the starting RBG index according to the following equation:

$$r = \text{Mod}(I, M)$$

wherein,

M is the number of PUCCH resources in the resource subset indicated by ARI bits; and I is the starting RBG index of the PDSCH.

PUCCH Resource Allocation Before RRC Connection Setup

Aspects disclosed herein are also directed towards allocating PUCCH resources before RRC connection setup. Here, with respect to resource allocation for HARQ-ACK before RRC connection setup, it should be appreciated that several agreements have been reached. For instance, an agreement was reached that a 4-bit RMSI indicates an entry into a 16-row table and each row in the table configures a set of cell-specific PUCCH resources/parameters. A PUCCH duration of at least {2, 14} was also agreed upon, wherein the starting symbol is symbol 12 within the slot when the PUCCH duration is two. Furthermore, if frequency hopping is enabled for long PUCCH, an agreement was reached that the PRB(s) of the two hops are x PRBs away from each edge of the initial uplink bandwidth part (UL BWP). For some implementations though, supporting frequency hopping for short PUCCH is also contemplated. Other implementations disclosed herein include various ways to enable frequency hopping, such as having frequency hopping always enabled, or enabling/disabling frequency hopping via an indication in remaining minimum system information (RMSI).

After an RRC connection set up, it should be noted that a normal PUCCH transmission has different repetition levels from 1 slot up to 8 slots. In order to meet the same performance requirement, the ACK transmission for MSG 4 should also have a comparable repetition level. Depending on the cell deployment (e.g., different cell radius and user capacity target), the cell-specific resource set for PUCCH before RRC connection setup may be configured differently which should be reflected in the RMSI mapping tables. However, to accommodate the UEs with different link budgets in a large cell at least, the corresponding resource set should include resources for both short and long duration, and for long duration with a different number of slots. The UE-specific channel condition may be estimated via reception of MSG3 (e.g., based on received power, how many retransmissions it takes to pass a cyclic redundancy check (CRC), etc.).

In an aspect disclosed herein, it is contemplated that frequency hopping and minimum cyclic shift distance should be cell-specifically enabled or disabled. For example, for a particularly small cell, UEs may be configured to have a minimal cyclic shift distance of 1 and without frequency hopping. For a large cell, however, UEs may be configured with a minimal cyclic shift distance of three and with frequency hopping enabled. To simplify, a particular design is contemplated in which intra-slot frequency hopping is only specified when inter-slot hopping is disabled. To minimize the impact of resource block (RB) segmentation caused by an ACK transmission in the initial access, the RBs for ACK transmissions may be placed toward the edge of the initial access UL BWP as much as possible.

Referring next to Table 4, an exemplary 16-row RMSI mapping table is provided in accordance with aspects disclosed herein. Here, it should be noted that N is the bandwidth of the initial access UL BWP. Also, when intra-slot frequency hopping is enabled, the RB index of the second hop follows the "mirror hopping" rule. For example, if the RB index of the first hop is m, the RB index of the second hop will be N−1−m. The other pair of RBs (N−1−m, m), if not used for ACK transmission for Msg4, may be assigned by the gNBs for ACK transmission after RRC configuration setup.

TABLE 4

Exemplary RMSI Mapping

| RMSI values | RB index of the 1$^{st}$ hop for short duration | RB index of the 1$^{st}$ hop for long duration with 1 slot | RB index of the 1$^{st}$ hop for long duration with 2 slots | RB index of the 1$^{st}$ hop for long duration with 4 slots | RB index of the 1$^{st}$ hop for long duration with 8 slots | Intra-slot freq. hopping enabled | Min. shift dist. | Exemp. scenario |
|---|---|---|---|---|---|---|---|---|
| 0 | {0} | NA | NA | NA | NA | 0 | 1 | extra small cell, 1RB, no hopping |
| 1 | NA | {0} | NA | NA | NA | 0 | 1 | extra small cell, 1 RB, no hopping |
| 2* | NA | {0, N-1} | NA | NA | NA | 0 | 2 | Small cell, 2 RBs, no hopping |
| 3* | {N-1} | {0} | NA | NA | NA | 0 | 2 | Small cell, 2 RBs, no hopping |
| 4* | {N-1} | {1, N-2} | {0} | NA | NA | 0 | 2 | Medium cell, 4 RBs, no hopping |
| 5 | NA | {0, N-1} | NA | NA | NA | 1 | 2 | Small cell, 2 RBs, hopping |
| 6 | {1} | {0} | NA | NA | NA | 1 | 2 | Small cell, 2 RBs, hopping |
| 7 | {1} | {0, N-1} | {2} | NA | NA | 1 | 2 | Medium cell, 4 RBs, hopping |
| 8* | NA | {N-1} | {0} | NA | NA | 0 | 3 | Medium cell, 2 RBs, no hopping |

TABLE 4-continued

Exemplary RMSI Mapping

| RMSI values | RB index of the 1st hop for short duration | RB index of the 1st hop for long duration with 1 slot | RB index of the 1st hop for long duration with 2 slots | RB index of the 1st hop for long duration with 4 slots | RB index of the 1st hop for long duration with 8 slots | Intra-slot freq. hopping enabled | Min. shift dist. | Exemp. scenario |
|---|---|---|---|---|---|---|---|---|
| 9* | {N-1} | {1, N-2} | {0} | NA | NA | 0 | 3 | Medium cell, 4 RBs, no hopping |
| 10* | {N-1} | {1} | {N-2} | {0} | NA | 0 | 3 | Large cell, 4 RBs, no hopping |
| 11* | NA | {2, N-3} | {1, N-2} | {N-1} | {0} | 0 | 3 | Extra large cell, 6 RBs, no hopping |
| 12 | NA | {1} | {0} | NA | NA | 1 | 3 | Medium cell, 2 RBs, hopping |
| 13 | {1} | {0, N-1} | {2} | NA | NA | 1 | 3 | Medium cell, 4 RBs, hopping |
| 14 | {3} | {2} | {1} | {0} | NA | 1 | 3 | Large cell, 4 RBs, hopping |
| 15 | NA | {0, N-1} | {1, N-2} | {2} | {3} | 1 | 3 | Extra large cell, 6 RBs, hopping |

From the RMSI mapping table, a UE can ascertain the minimum shift index, intra-slot frequency hopping, and the possible transmission duration. In an aspect disclosed herein, however, it is contemplated that a rule may be defined for the UE to determine the particular parameters for its transmission including the number of slots, short or long duration (2 or 14 symbols), RB index, orthogonal cover code (OCC) index, and cyclic shift index.

For a resource set with a mixed duration (e.g., short and long duration), or a long duration with a different number of slots, the selection of different transmission durations may be indicated by ARI bits explicitly so that the gNB can correctly match the appropriate duration with a UE's channel condition. For a resource set with less than four duration possibilities, the ARI bits may be used to indicate additional resource information (e.g., the subset of RBs or cyclic shifts). The particular resource within the subset may be selected based on implicit mapping. In Table 5, an exemplary ARI mapping rule for different RMSI values is provided.

TABLE 5

ARI Mapping for Different RMSI Values

| RMSI values | ARI = 0 | ARI = 1 | ARI = 2 | ARI = 3 |
|---|---|---|---|---|
| 0 | Short duration, RB 0, initial shifts {0, 1, 2} | Short duration, RB 0, initial shifts {3, 4, 5} | Short duration, RB 0, initial shifts {6, 7, 8} | Short duration, RB 0, initial shifts {9, 10, 11} |
| 1 | long duration, RB 0, shifts {0, 1, 2}, 1 slot OCC {0, 1, 2} | long duration, RB 0, shifts {3, 4, 5}, 1 slot OCC {0, 1, 2} | long duration, RB 0, shifts {6, 7, 8}, 1 slot OCC {0, 1, 2} | long duration, RB 0, shifts {9, 10, 11}, 1 slot OCC {0, 1, 2} |
| 2* | long duration, RB 0, shifts {0, 2, 4}, 1 slot OCC {0, 1, 2} | long duration, RB 0, shifts {6, 8, 10}, 1 slot OCC {0, 1, 2} | long duration, RB N-1, shifts {0, 2, 4}, 1 slot OCC {0, 1, 2} | long duration, RB N-1, shifts {6, 8, 10}, 1 slot OCC {0, 1, 2} |

TABLE 5-continued

ARI Mapping for Different RMSI Values

| RMSI values | ARI = 0 | ARI = 1 | ARI = 2 | ARI = 3 |
|---|---|---|---|---|
| 3* | short duration, RB N-1, initial shifts {0, 2, 4} | Long duration, RB 0, initial shifts {0, 2}, 1 slot OCC {0, 1, 2} | long duration, RB 0, shifts {4, 6}, 1 slot OCC {0, 1, 2} | long duration, RB 0, shifts {8, 10}, 1 slot OCC {0, 1, 2} |
| 4* | short duration, RB N-1, initial shifts {0, 2, 4} | Long duration, RB 1, shifts {0, 2, 4, 6, 8, 10}, 1 slot OCC {0, 1, 2} | Long duration, RB N-2, shifts {0, 2, 4, 6, 8, 10}, 1 slot OCC {0, 1, 2} | Long duration, RB 0, shifts {0, 2, 4, 6, 8, 10}, 2 slots OCC {0, 1, 2} |
| 5 | long duration, RB 0, shifts {0, 2, 4}, 1 slot OCC {0, 1, 2} | long duration, RB 0, shifts {6, 8, 10}, 1 slot OCC {0, 1, 2} | long duration, RB N-1, shifts {0, 2, 4}, 1 slot OCC {0, 1, 2} | long duration, RB N-1, shifts {6, 8, 10}, 1 slot OCC {0, 1, 2} |
| 6 | short duration, RB 1, initial shifts {0, 2, 4} | Long duration, RB 0, shifts {0, 2}, 1 slot OCC {0, 1, 2} | long duration, RB 0, shifts {4, 6}, 1 slot OCC {0, 1, 2} | long duration, RB 0, shifts {8, 10}, 1 slot OCC {0, 1, 2} |
| 7 | short duration, RB 1, initial shifts {0, 2, 4} | Long duration, RB 0, shifts {0, 2, 4, 6, 8, 10}, 1 slot OCC {0, 1, 2} | Long duration, RB N-1, shifts {0, 2, 4, 6, 8, 10}, 1 slot OCC {0, 1, 2} | Long duration, RB 2, shifts {0, 2, 4, 6, 8, 10}, 2 slots OCC {0, 1, 2} |
| 8* | Long duration, RB N-1, shifts {0, 3}, 1 slot OCC {0, 1, 2} | Long duration, RB N-1, shifts {6, 9}, 1 slot OCC {0, 1, 2} | Long duration, RB 0, shifts {0, 3}, 2 slots OCC {0, 1, 2} | Long duration, RB 0, shifts {6, 9}, 2 slots OCC {0, 1, 2} |
| 9* | short duration, RB N-1, initial shifts {0, 3} | Long duration, RB 1, shifts {0, 3, 6, 9}, 1 slot OCC {0, 1, 2} | Long duration, RB N-2, shifts {0, 3, 6, 9}, 1 slot OCC {0, 1, 2} | Long duration, RB 0, shifts {0, 3, 6, 9}, 2 slots OCC {0, 1, 2} |
| 10* | short duration, RB N-1, initial shifts {0, 3} | Long duration, RB 1, shifts {0, 3, 6, 9}, 1 slot OCC {0, 1, 2} | Long duration, RB N-2, shifts {0, 3, 6, 9}, 2 slots OCC {0, 1, 2} | Long duration, RB 0, shifts {0, 3, 6, 9}, 4 slots OCC {0, 1, 2} |
| 11* | Long duration, RB {2, N-3}, shifts {0, 3, 6, 9}, 1 slot OCC {0, 1, 2} | Long duration, RB {1. N-2}, shifts {0, 3, 6, 9}, 2 slots OCC {0, 1, 2} | Long duration, RB N-1, shifts {0, 3, 6, 9}, 4 slots OCC {0, 1, 2} | Long duration, RB 0, shifts {0, 3, 6, 9}, 8 slots OCC {0, 1, 2} |
| 12 | Long duration, RB 1, shifts {0, 3}, 1 slot OCC {0, 1, 2} | Long duration, RB 1, shifts {6, 9}, 1 slot OCC {0, 1, 2} | Long duration, RB 0, shifts {0, 3}, 2 slots OCC {0, 1, 2} | Long duration, RB 0, shifts {6, 9}, 2 slots OCC {0, 1, 2} |
| 13 | short duration, RB 1, initial shifts {0, 3} | Long duration, RB 0, shifts {0, 3, 6, 9}, 1 slot OCC {0, 1, 2} | Long duration, RB N-1, shifts {0, 3, 6, 9}, 1 slot OCC {0, 1, 2} | Long duration, RB 1, shifts {0, 3, 6, 9}, 2 slots OCC {0, 1, 2} |
| 14 | short duration, RB 3, initial shifts {0, 3} | Long duration, RB 2, shifts {0, 3, 6, 9}, 1 slot OCC {0, 1, 2} | Long duration, RB 1, shifts {0, 3, 6, 9}, 2 slots OCC {0, 1, 2} | Long duration, RB 0, shifts {0, 3, 6, 9}, 4 slots OCC {0, 1, 2} |
| 15 | Long duration, RB {0, N-1}, shifts {0, 3, 6, 9}, 1 slot OCC {0, 1, 2} | Long duration, RB {1. N-2}, shifts {0, 3, 6, 9}, 2 slots OCC {0, 1, 2} | Long duration, RB 2, shifts {0, 3, 6, 9}, 4 slots OCC {0, 1, 2} | Long duration, RB 3, shifts {0, 3, 6, 9}, 8 slots OCC {0, 1, 2} |

Another way of constructing an RMSI table is to have a resource set defined for single slot transmission only, and then use the ARI value to indicate the repetition level. In this case, different durations may be used, as indicated in the various configurations listed in Table 6 below.

TABLE 6

RMSI Mapping (First Alternative)

| RMSI values | RB index of the 1st hop for short duration | RB index of the 1st hop for long duration with 1 slot | Intra-slot freq. hopping enabled | Minimum shift distance | Number of resources |
|---|---|---|---|---|---|
| 0* | {0} | NA | 0 | 1 | 12 |
| 1 | {0, 1} | NA | 0 | 2 | 12 |
| 2 | {0, 1} | NA | 1 | 2 | 12 |
| 3* | NA | {0} | 0 | 1 | 36 |
| 4* | NA | {0} | 1 | 1 | 36 |
| 5 | NA | {0, 1} | 0 | 2 | 36 |
| 6 | NA | {0, 1} | 1 | 2 | 36 |
| 7* | NA | {0, 1} | 0 | 3 | 24 |
| 8* | NA | {0, 1} | 1 | 3 | 24 |
| 9 | NA | {0, 1, 2} | 0 | 3 | 36 |
| 10 | NA | {0, 1, 2} | 1 | 3 | 36 |
| 10 | | | Reserved | | |
| 11 | | | | | |
| 12 | | | | | |
| 13 | | | | | |
| 14 | | | | | |
| 15 | | | | | |

It should also be noted that particular considerations are contemplated for when the PDCCH is scrambled with a temp-RNTI. In this case, the ARI in DCI may be used to select the UE-specific repetition level, as indicated in the various configurations listed in Table 7 below.

TABLE 7

ARI Mapping (First Alternative)

| ARI | Repetition level |
|---|---|
| 0 | 1 |
| 1 | 2 |
| 2 | 4 |
| 3 | 8 |

Taking into account the various considerations above, several particular implementations are contemplated. For instance, with respect to PUCCH resource allocation before an RRC connection setup, it is contemplated that a multi-row RMSI mapping table may be defined (e.g., a 16-row table) to specify any of various parameters. Such parameters may, for example, include: whether intra-slot hopping is enabled or not; the minimum cyclic shift distance; and/or the RB index for the first hop for short duration or long duration, wherein the RBs used for a PUCCH transmission may be placed toward the edge of the system, if possible. In another aspect disclosed herein, for a PUCCH resource allocation before RRC connection setup, it is also contemplated that the ARI may be used to indicate the repetition level of the ACK transmission.

It should be appreciated that the aspects disclosed herein may be compatible with any of several types of RMSI tables. For instance, a particular RMSI table is contemplated in which each row has a single duration, which can indicate that all UEs will use the same duration, regardless of UE conditions. An example of such mapping is provided in Table 8 below. For this implementation, it should be noted that the ARI mapping may correspond to different RMSI values according to various priorities. For instance, the ARI may be used to indicate one or more RB indices for the duration. The ARI may also be used to indicate one or more cyclic shift indices within the RB.

TABLE 8

RMSI Mapping (Second Alternative)

| RMSI values | RB index of the 1st hop for short duration | RB index of the 1st hop for long duration with 1 slot | RB index of the 1st hop for long duration with 2 slots | RB index of the 1st hop for long duration with 4 slots | RB index of the 1st hop for long duration with 8 slots | Intra-slot freq. hopping enabled | Min. shift dist. |
|---|---|---|---|---|---|---|---|
| 0 | {0} | NA | NA | NA | NA | 0 | 1 |
| 1 | NA | {0} | NA | NA | NA | 0 | 1 |
| 2* | NA | {0, N-1} | NA | NA | NA | 0 | 2 |
| 3* | NA | NA | {0, N-1} | NA | NA | 0 | 2 |
| 4 | NA | {0, N-1} | NA | NA | NA | 1 | 2 |
| 5 | NA | NA | {0, N-1} | NA | NA | 1 | 2 |
| 6* | NA | NA | {0, N-1} | NA | NA | 0 | 3 |
| 7* | NA | NA | NA | {0, N1} | NA | 0 | 3 |
| 8* | NA | NA | NA | NA | {0} | 0 | 3 |
| 9 | NA | NA | {0, N-1} | NA | NA | 1 | 3 |
| 10 | NA | NA | NA | {0, N-1} | NA | 1 | 3 |
| 11 | NA | NA | NA | NA | {0, N-1, 1, N-2} | 1 | 3 |
| 12 | | | reserved | | | | |
| 13 | | | reserved | | | | |
| 14 | | | reserved | | | | |
| 15 | | | reserved | | | | |

During initial access, it should be noted that multiple PDCCHs are not mapped to a single PUCCH-ACK (i.e., no cross-slot scheduling or CA). Therefore, the UE either decodes the PDCCH and gets the correct ACK resource, or the UE misses the grant (i.e., discontinuous reception (DTX)), wherein there is no resource confusion between the UE and the gNB. The CCE-based implicit mapping disclosed herein provides a desirable solution for selecting resources within a resource subset. For instance, an exemplary implementation may use the same implicit mapping function as in the connected state. Once the relative resource set within the subset is ascertained, the cyclic shift index or RB index of the resource subset may be determined, as defined in the ARI mapping table.

As disclosed herein, for PUCCH resource allocation before RRC connection setup, it is thus contemplated that the relative resource index, r, of a subset may be derived based on the following equation:

$$r = \text{Mod}\left(\frac{C}{L}, M\right)$$

wherein,

M is the number of PUCCH resources in the resource subset indicated by ARI bits;

C is the starting CCE index of the PDCCH containing the ARI bits; and

L is the aggregation level of the PDCCH containing the ARI bits.

It should also be noted that LTE supports semi-persistent scheduling (SPS), wherein the PDCCH indicating release of a SPS assignment is acknowledged by the UE. This allows the base station to confirm that the UE has released the assignment before assigning the SPS resources to other UEs. In NR, more generally, there may be other commands issued via PDCCH for which there is no corresponding PDSCH packet and thus no natural acknowledgment transmission. If such commands are identified, it is reasonable to consider acknowledgment for such PDCCH transmissions as well, similar to the LTE SPS-release ACK. Moreover, such ACK may follow similar rules and procedures as ACKs for NR PDSCH, with regard to resource allocation. Since there is no PDSCH, the ACK timing is then related to the corresponding PDCCH timing, just as in LTE SPS-release. In LTE the SPS related PDCCH uses a different RNTI than PDSCH, although it should be noted that this is not a requirement for considering whether a NR PDCCH needs acknowledgment. One example of a PDCCH in which an acknowledgment may be allowed is a PDCCH that does not schedule any packets, but rather only indicates change of beam, since missing this PDCCH may result in a beam mismatch between the UE and the base station. Accordingly, as disclosed herein, an implementation is contemplated in which an ACK for PDCCH is transmitted, which indicates beam switching (similar to ACK for SPS release in LTE).

Exemplary Scheduling Entity

Figure 7:
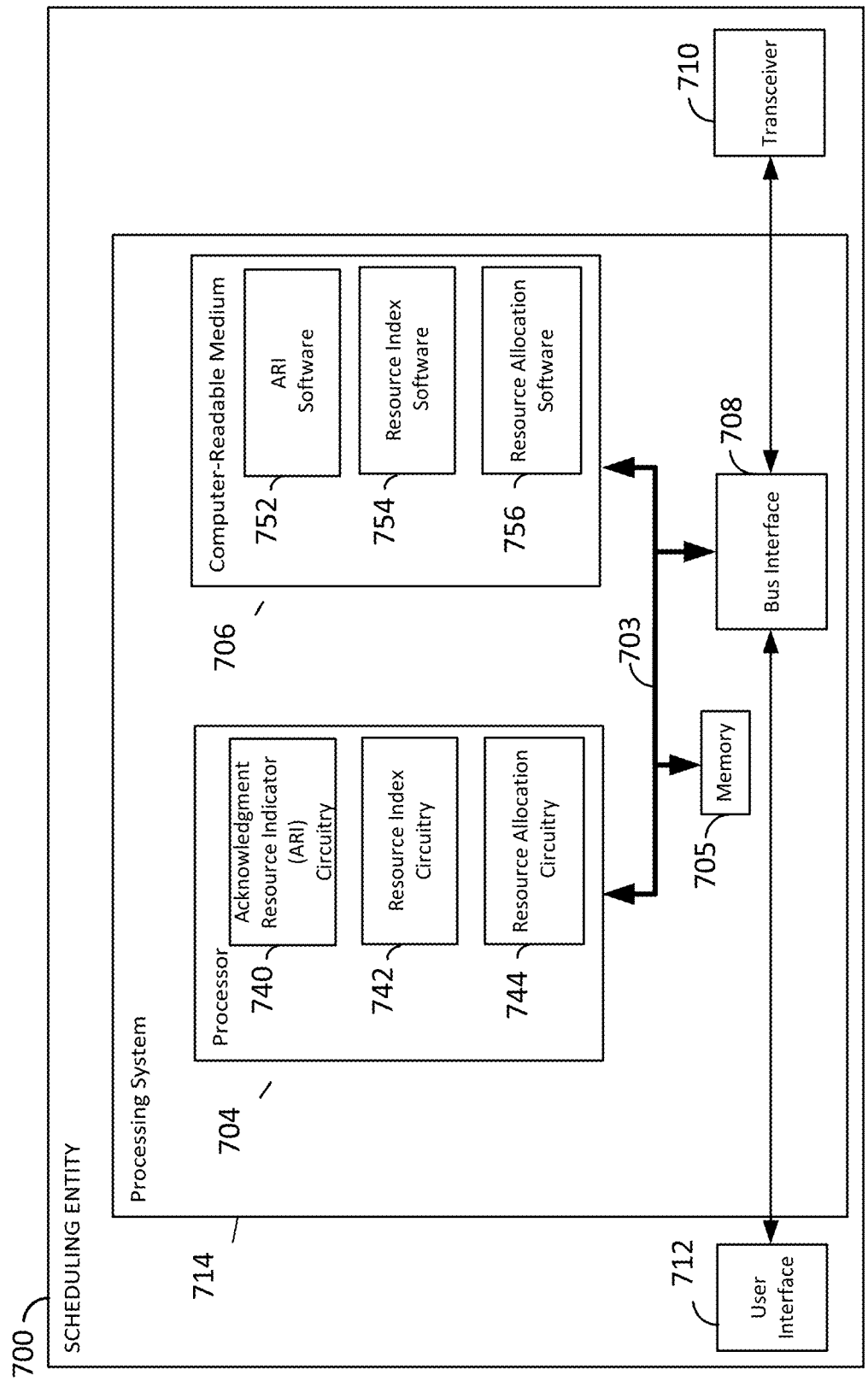
FIG. 7 is a block diagram illustrating an example of a hardware implementation for a scheduling entity employing a processing system in accordance with aspects disclosed herein.

FIG. 7 is a block diagram illustrating an example of a hardware implementation for a scheduling entity 700 employing a processing system 714. For example, the scheduling entity 700 may be a user equipment (UE) as illustrated in any one or more of the FIGs. disclosed herein. In another example, the scheduling entity 700 may be a base station (e.g., a gNB) as also illustrated in any one or more of the FIGs. disclosed herein.

The scheduling entity 700 may be implemented with a processing system 714 that includes one or more processors 704. Examples of processors 704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 700 may be configured to perform any one or more of the functions described herein. That is, the processor 704, as utilized in a scheduling entity 700, may be used to implement any one or more of the processes and procedures described below and illustrated in FIG. 8.

In this example, the processing system 714 may be implemented with a bus architecture, represented generally by the bus 702. The bus 702 may include any number of interconnecting buses and bridges depending on the specific application of the processing system 714 and the overall design constraints. The bus 702 communicatively couples together various circuits including one or more processors (represented generally by the processor 704), a memory 705, and computer-readable media (represented generally by the computer-readable medium 706). The bus 702 may also link various other circuits such as timing sources, peripherals, voltage regulators, and power management circuits, which are well known in the art, and therefore, will not be described any further. A bus interface 708 provides an interface between the bus 702 and a transceiver 710. The transceiver 710 provides a communication interface or means for communicating with various other apparatus over a transmission medium. Depending upon the nature of the apparatus, a user interface 712 (e.g., keypad, display, speaker, microphone, joystick) may also be provided.

In some aspects of the disclosure, the processor 704 may include an acknowledgment resource indicator (ARI) circuitry 740 configured for various functions, including, for example, to map ARI values to a plurality of different remaining minimum system information (RMSI) values. As illustrated, the processor 704 may also include a resource index circuitry 742 configured for various functions. For instance, the resource index circuitry 742 may be configured to map a resource index to at least one of a control channel element (CCE) index or a resource block group (RBG) index. The processor 704 may further include resource allocation circuitry 744 configured for various functions, including, for example, to configure at least one UE to ascertain resources for a PUCCH in accordance with an explicit mapping and an implicit mapping. For this example, the explicit mapping facilitates an identification of a subset of a resource set based on the mapping of ARI values, whereas the implicit mapping facilitates a derivation of the resource index to identify a corresponding resource within the subset. For some implementations, the resource allocation circuitry 744 may also be configured to configure the UE to transmit an acknowledgment (ACK) of a physical downlink control channel (PDCCH) to indicate a beam switching. Here, it should be appreciated that, the combination of the ARI circuitry 740, the resource index circuitry 742, and the resource allocation circuitry 744 may be configured to implement one or more of the functions described herein.

Various other aspects of scheduling entity 700 are also contemplated. In some implementations, for instance, it is contemplated that the ARI circuitry 740 may be configured to associate ARI values with any of various parameters. For example, the ARI circuitry 740 may be configured to associate ARI values with one of a short duration in the resource set or a long duration in the resource set (e.g., where the resource subset indicated by the ARI bits include resources in either a short or long duration, but not both). In another aspect disclosed herein, the ARI circuitry 740 may be configured to associate the ARI values with a repetition level of an ACK transmission, and/or the ARI circuitry 740 may be configured to associate the ARI values with a fixed orthogonal cover code (OCC) index (e.g., index 0).

Further aspects of the ARI circuitry 740 are also contemplated and disclosed herein. For instance, it is contemplated that the ARI circuitry 740 may be configured to maintain an RMSI table that specifies any of various parameters. In a particular implementation, the RMSI table specifies at least one of whether an intra-slot hopping functionality is enabled; a minimum cyclic shift distance; or a resource block (RB) index. It is also contemplated that the ARI circuitry 740 may be configured to prioritize the mapping of ARI values to indicate any of various items. For instance, the mapping of ARI values may be prioritized to indicate at least one of a transmission duration; at least one RB index for the duration; or at least one cyclic shift index within the RB.

In another aspect of the disclosure, particular implementations are contemplated for the resource index circuitry 742. For instance, when the scheduling entity 700 configures a UE for resource allocation after a radio resource control (RRC) connection setup, it is contemplated that the resource index circuitry 742 may be configured to facilitate an implicit mapping of the resource index based on a starting RBG index of a physical downlink shared channel (PDSCH). Alternatively, for a resource allocation after an RRC connection setup, the resource index circuitry 742 may be configured to facilitate an implicit mapping of the resource index based on a starting CCE index of a last received downlink control information (DCI) within an ACK bundling window. For a resource allocation before an RRC connection setup, the resource index circuitry 742 may be configured to facilitate an implicit mapping of the resource index based on a starting CCE index of a DCI that includes bits corresponding to an ARI value.

Referring back to the remaining components of scheduling entity 700, it should be appreciated that the processor 704 is responsible for managing the bus 702 and general processing, including the execution of software stored on the computer-readable medium 706. The software, when executed by the processor 704, causes the processing system 714 to perform the various functions described below for any particular apparatus. The computer-readable medium 706 and the memory 705 may also be used for storing data that is manipulated by the processor 704 when executing software.

One or more processors 704 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 706. The computer-readable medium 706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 706 may reside in the processing system 714, external to the processing system 714, or distributed across multiple entities including the processing system 714. The computer-readable medium 706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 706 may include ARI software 752 configured for various functions, including, for example, to map ARI values to a plurality of different RMSI values. As illustrated, the computer-readable storage medium 706 may also include resource index software 754 configured for various functions. For instance, the resource index software 754 may be configured to map a resource index to at least one of a CCE index or an RBG index. The computer-readable storage medium 706 may further include resource allocation software 756 configured for various functions, including, for example, to configure at least one UE to ascertain resources for a PUCCH in accordance with an explicit mapping and an implicit mapping. For this example, the explicit mapping facilitates an identification of a subset of a resource set based on the mapping of ARI values, whereas the implicit mapping facilitates a derivation of the resource index to identify a corresponding resource within the subset.

In a particular configuration, it is also contemplated that the scheduling entity 700 includes means for mapping ARI values to a plurality of different RMSI values; means for mapping a resource index to at least one of a CCE index or an RBG index; and means for configuring at least one UE to ascertain resources for a PUCCH in accordance with an explicit mapping and an implicit mapping. In one aspect, the aforementioned means may be the processor(s) 704 configured to perform the functions recited by the aforementioned means. In another aspect, the aforementioned means may be a circuit or any apparatus configured to perform the functions recited by the aforementioned means.

Figure 8:
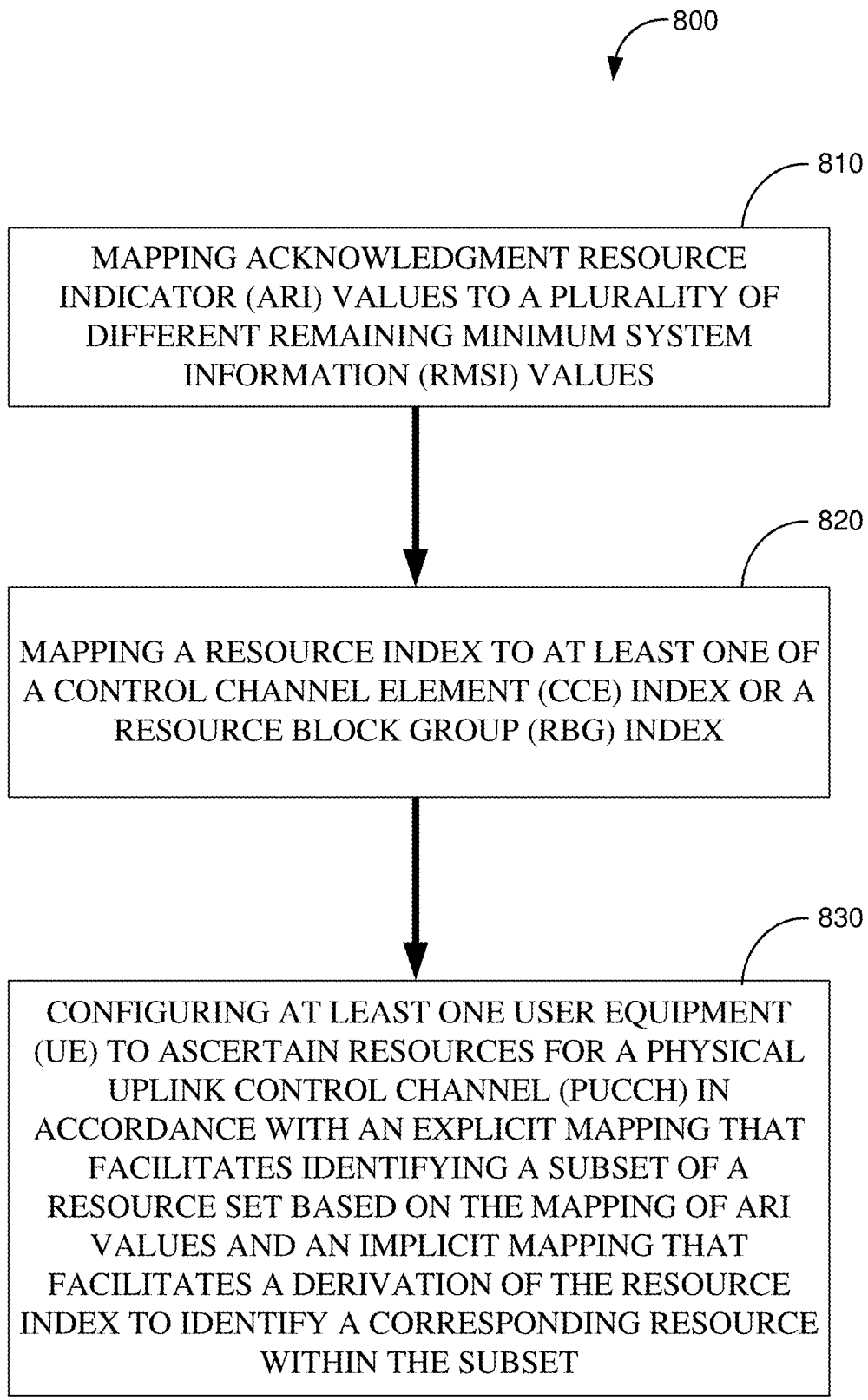
FIG. 8 is a flow chart illustrating an exemplary scheduling entity process that facilitates some aspects of the disclosure.

Of course, in the above examples, the circuitry included in the processor 704 is merely provided as an example, and other means for carrying out the described functions may be included within various aspects of the present disclosure, including but not limited to the instructions stored in the computer-readable storage medium 706, or any other suitable apparatus or means described herein and utilizing, for example, the processes and/or algorithms described in relation to FIG. 8.

In FIG. 8, a flow chart is provided, which illustrates an exemplary scheduling entity process that facilitates some aspects of the disclosure. As described below, some or all illustrated features may be omitted in a particular implementation within the scope of the present disclosure, and some illustrated features may not be required for implementation of all embodiments. In some examples, the process 800 may be carried out by the scheduling entity 700 illustrated in FIG. 7. In some examples, the process 800 may be carried out by any suitable apparatus or means for carrying out the functions or algorithm described below.

Process 800 begins at block 810 with the scheduling entity 700 (e.g., a gNB) mapping ARI values to a plurality of different RMSI values. Process 800 then proceeds to block 820 with the scheduling entity 700 mapping a resource index to at least one of a CCE index or an RBG index. Process 800 then concludes at block 830 where the scheduling entity 700 configures at least one UE to ascertain resources for a PUCCH in accordance with an explicit mapping that facilitates identifying a subset of a resource set based on the mapping of ARI values and an implicit mapping that facilitates a derivation of the resource index to identify a corresponding resource within the subset.

Exemplary Scheduled Entity

Figure 9:
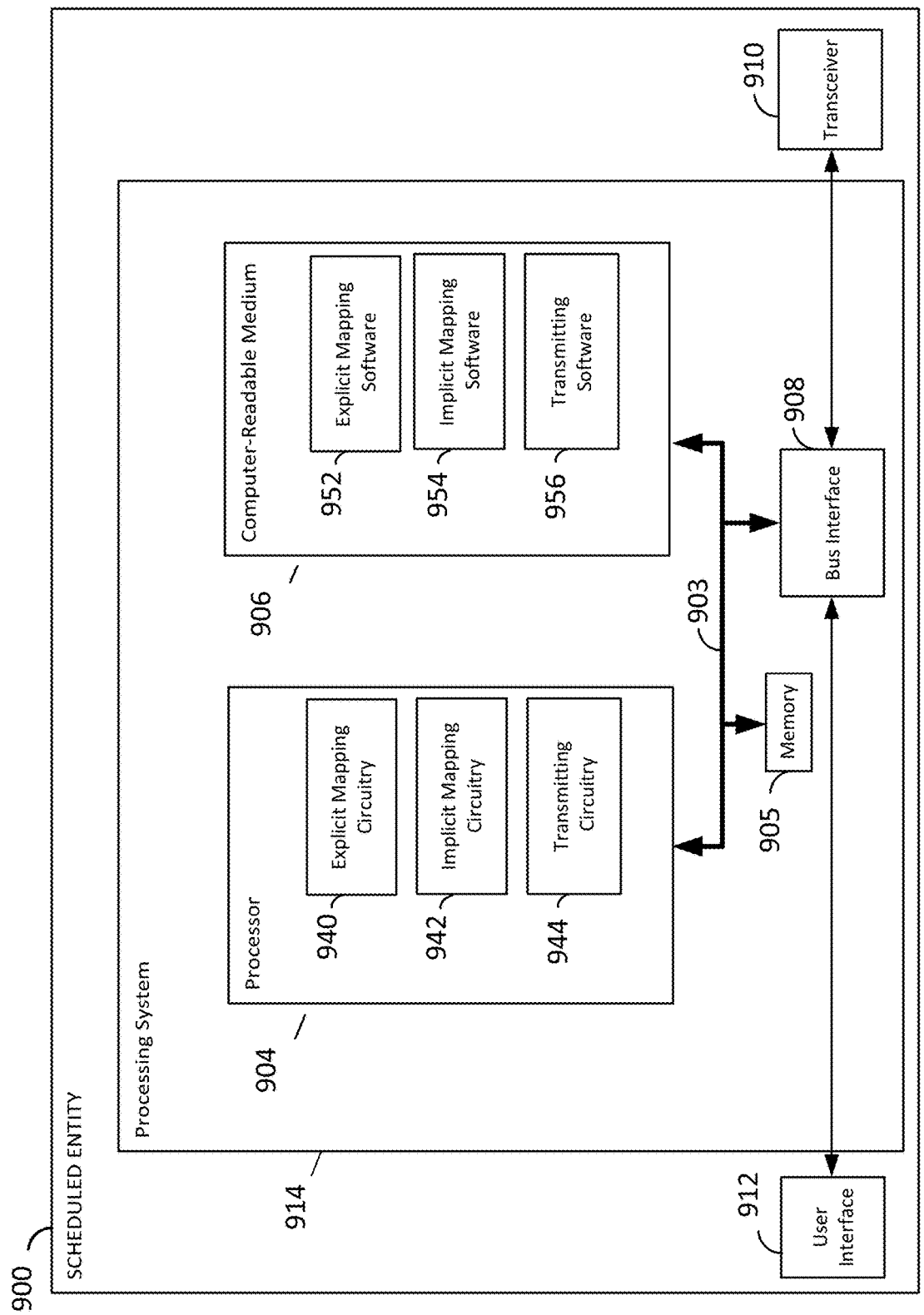
FIG. 9 is a block diagram illustrating an example of a hardware implementation for a scheduled entity employing a processing system in accordance with aspects disclosed herein.

FIG. 9 is a conceptual diagram illustrating an example of a hardware implementation for an exemplary scheduled entity 900 employing a processing system 914. In accordance with various aspects of the disclosure, an element, or any portion of an element, or any combination of elements may be implemented with a processing system 914 that includes one or more processors 904. For example, the scheduled entity 900 may be a user equipment (UE) as illustrated in any one or more of the FIGs. disclosed herein.

The processing system 914 may be substantially the same as the processing system 714 illustrated in FIG. 7, including a bus interface 908, a bus 902, memory 905, a processor 904, and a computer-readable medium 906. Furthermore, the scheduled entity 900 may include a user interface 912 and a transceiver 910 substantially similar to those described above in FIG. 7. That is, the processor 904, as utilized in a scheduled entity 900, may be used to implement any one or more of the processes described below and illustrated in the various figures.

In some aspects of the disclosure, the processor 904 may include an explicit mapping circuitry 940 configured for various functions, including, for example, to identify a subset of a resource set corresponding to a physical uplink control channel (PUCCH) based on an explicit mapping of acknowledgment resource indicator (ARI) values to a plurality of different remaining minimum system information (RMSI) values. As illustrated, the processor 904 may also include an implicit mapping circuitry 942 configured for various functions. For instance, the implicit mapping circuitry 942 may be configured to derive a resource index corresponding to a resource within the subset based on an implicit mapping of the resource index to at least one of a control channel element (CCE) index or a resource block group (RBG) index. The processor 904 may further include a transmitting circuitry 944 configured for various functions, including, for example, to transmit a PUCCH communication via the resource. Here, it should be appreciated that the transmitting circuitry 944 may be further configured to transmit an acknowledgment (ACK) of a physical downlink control channel (PDCCH) to indicate a beam switching. Furthermore, it should be appreciated that, the combination of the explicit mapping circuitry 940, the implicit mapping circuitry 942, and the transmitting circuitry 944 to implement one or more of the functions described herein.

Various other aspects of scheduled entity 900 are also contemplated. In some implementations, for instance, it is contemplated that the explicit mapping circuitry 940 may be configured to associate ARI values with any of various parameters. For example, the explicit mapping circuitry 940 may be configured to associate ARI values with one of a short duration in the resource set or a long duration in the resource set (e.g., where the resource subset indicated by the ARI bits include resources in either a short or long duration, but not both). In another aspect disclosed herein, the explicit mapping circuitry 940 may be configured to associate the ARI values with a repetition level of an ACK transmission, and/or the explicit mapping circuitry 940 may be configured to associate the ARI values with a fixed orthogonal cover code (OCC) index (e.g., index 0).

Further aspects of the explicit mapping circuitry 940 are also contemplated and disclosed herein. For instance, it is contemplated that the explicit mapping circuitry 940 may be configured to maintain an RMSI table that specifies any of various parameters. In a particular implementation, the RMSI table specifies at least one of whether an intra-slot hopping functionality is enabled; a minimum cyclic shift distance; or a resource block (RB) index. It is also contemplated that the explicit mapping circuitry 940 may be configured to prioritize the mapping of ARI values to indicate any of various items. For instance, the mapping of ARI values may be prioritized to indicate at least one of a transmission duration; at least one RB index for the duration; or at least one cyclic shift index within the RB.

In another aspect of the disclosure, particular implementations are contemplated for the implicit mapping circuitry 942. For instance, when the scheduled entity 900 allocates resources after a radio resource control (RRC) connection setup, it is contemplated that the implicit mapping circuitry 942 may be configured to derive the resource index based on a starting RBG index of a physical downlink shared channel (PDSCH). Alternatively, for a resource allocation after an RRC connection setup, the implicit mapping circuitry 942 may be configured to derive the resource index based on a starting CCE index of a last received downlink control information (DCI) within an ACK bundling window. For a resource allocation before an RRC connection setup, the implicit mapping circuitry 942 may be configured to derive the resource index based on a starting CCE index of a DCI that includes bits corresponding to an ARI value.

Referring back to the remaining components of scheduled entity 900, similar to processor 704, processor 904 is responsible for managing the bus 902 and general processing, including the execution of software stored on the computer-readable medium 906. The software, when executed by the processor 904, causes the processing system 914 to perform the various functions described below for any particular apparatus. The computer-readable medium 906 and the memory 905 may also be used for storing data that is manipulated by the processor 904 when executing software.

One or more processors 904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 906. Similar to computer-readable medium 706, computer-readable medium 906 may be a non-transitory computer-readable medium comprising characteristics that are substantially similar. The computer-readable medium 906 may reside in the processing system 914, external to the processing system 914, or distributed across multiple entities including the processing system 914. It should also be appreciated that, similar to computer-readable medium 706, computer-readable medium 906 may be embodied in a computer program product comprising characteristics that are substantially similar.

In one or more examples, the computer-readable storage medium 906 may include explicit mapping software 952 configured for various functions, including, for example, to identify a subset of a resource set corresponding to a PUCCH based on an explicit mapping of ARI values to a plurality of different RMSI values. As illustrated, the computer-readable medium 906 may also include implicit mapping software 954 configured for various functions. For instance, the implicit mapping software 954 may be configured to derive a resource index corresponding to a resource within the subset based on an implicit mapping of the resource index to at least one of a CCE index or an RBG index. The computer-readable medium 906 may further include transmitting software 956 configured for various functions, including, for example, to transmit a PUCCH communication via the resource.

In a particular configuration, it is also contemplated that the scheduled entity 900 includes means for identifying a subset of a resource set corresponding to a PUCCH based on an explicit mapping of ARI values to a plurality of different RMSI values; means for deriving a resource index corresponding to a resource within the subset based on an implicit mapping of the resource index to at least one of a CCE index or an RBG index; and means for transmitting a PUCCH communication via the resource. In one aspect, the aforementioned means may be the processor(s) 904 configured to perform the functions recited by the aforementioned means. In another aspect, the aforementioned means may be a circuit or any apparatus configured to perform the functions recited by the aforementioned means.

Figure 10:
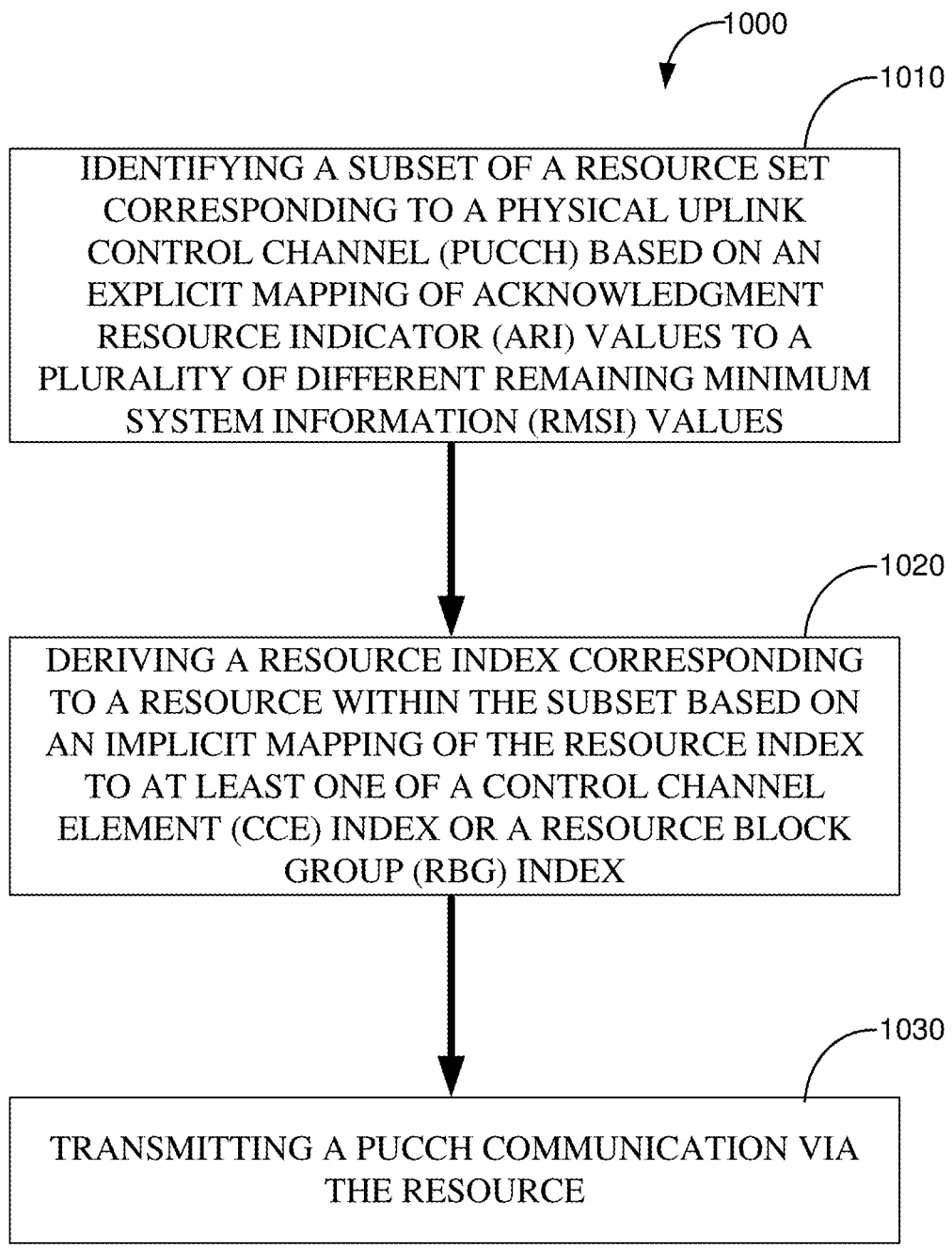
FIG. 10 is a flow chart illustrating an exemplary scheduled entity process that facilitates some aspects of the disclosure.

Of course, in the above examples, the circuitry included in the processor 904 is merely provided as an example, and other means for carrying out the described functions may be included within various aspects of the present disclosure, including but not limited to the instructions stored in the computer-readable storage medium 906, or any other suitable apparatus or means described herein, and utilizing, for example, the processes and/or algorithms described in relation to FIG. 10.

In FIG. 10, a flow chart is provided, which illustrates an exemplary scheduled entity process for performing some aspects of the disclosure. As described below, some or all illustrated features may be omitted in a particular implementation within the scope of the present disclosure, and some illustrated features may not be required for implementation of all embodiments. In some examples, the process 1000 may be carried out by the scheduled entity 900 illustrated in FIG. 9. In some examples, the process 1000 may be carried out by any suitable apparatus or means for carrying out the functions or algorithm described below.

Process 1000 begins at block 1010 with the scheduled entity 900 identifying a subset of a resource set corresponding to a PUCCH based on an explicit mapping of ARI values to a plurality of different RMSI values. At block 1020, process 1000 continues with the scheduled entity 900 deriving a resource index corresponding to a resource within the subset based on an implicit mapping of the resource index to at least one of a CCE index or an RBG index. Process 1000 then concludes at block 1030 where the scheduled entity 900 transmits a PUCCH communication via the resource.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-10 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-10 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication performed by a user equipment (UE), comprising:
   receiving, from a base station, a remaining minimum system information (RMSI) value;
   receiving, from the base station, downlink control information (DCI) that indicates a control channel element (CCE) index and an acknowledgment resource indicator (ARI) value;
   determining a set of resource block (RB) indices and a set of cyclic shift indices based on the RMSI value;
   determining a physical uplink control channel (PUCCH) resource for transmitting a PUCCH communication, the determination including determining an RB index from the set of RB indices and a cyclic shift index from the set of cyclic shift indices based on the ARI value and the indication of the CCE index;
   transmitting, to the base station, a PUCCH communication via the determined PUCCH resource.

2. The method of claim 1, wherein the determination of the PUCCH resource is performed prior to establishing a radio resource control (RRC) connection with the base station.

3. The method of claim 1, further comprising using a fixed orthogonal cover code (OCC) with the determined PUCCH resource.

4. The method of claim 1, wherein the determination of the RB index is further associated with a duration or a frequency hop.

5. A user equipment (UE), comprising:
   a processor; and
   a memory storing code that, when executed by the processor, is configured to cause the processor to:
      receive, from a base station, a remaining minimum system information (RMSI) value;
      receive, from the base station, downlink control information (DCI) that indicates a control channel element (CCE) index and an acknowledgment resource indicator (ARI) value;
      determine a set of resource block (RB) indices and a set of cyclic shift indices based on the RMSI value;
      determine a physical uplink control channel (PUCCH) resource for transmitting a PUCCH communication, the determination including determining an RB index from the set of RB indices and a cyclic shift index from the set of cyclic shift indices based on the ARI value and the indication of the CCE index;
      transmit, to the base station, a PUCCH communication via the determined PUCCH resource.

6. The UE of claim 5, wherein the determination of the PUCCH resource is performed prior to establishing a radio resource control (RRC) connection with the base station.

7. The UE of claim 5, wherein the code, when executed by the processor, is further configured to cause the processor to use a fixed orthogonal cover code (OCC) with the determined PUCCH resource.

8. The UE of claim 5, wherein the determination of the RB index is further associated with a duration or a frequency hop.

9. A method of wireless communication performed by a base station, comprising:
   transmitting a remaining minimum system information (RMSI) value, the RMSI value indicating, to one or more user equipment (UEs), a set of resource block (RB) indices and a set of cyclic shift indices associated with the RMSI value for transmitting physical uplink control channel (PUCCH) communications;
   transmitting downlink control information (DCI) that indicates a control channel element (CCE) index and an acknowledgment resource indicator (ARI) value, the CCE index and the ARI value indicating, to at least one of the one or more UEs, an RB index from the set of RB indices and a cyclic shift index from the set of cyclic shift indices associated with a PUCCH resource for transmitting a PUCCH communication; and
   receiving, from the at least one UE, the PUCCH communication via the PUCCH resource.

10. The method of claim 9, wherein the transmission of the RMSI value and the DCI is performed prior to establishing a radio resource control (RRC) connection with the at least one UE.

11. The method of claim 9, further comprising using a fixed orthogonal cover code (OCC) with the PUCCH resource.

12. The method of claim 9, wherein the RB index is further associated with a duration or a frequency hop.

13. A base station, comprising:
    a processor; and
    a memory storing code that, when executed by the processor, is configured to cause the processor to:
       transmit a remaining minimum system information (RMSI) value, the RMSI value indicating, to one or more user equipment (UEs), a set of resource block (RB) indices and a set of cyclic shift indices associated with the RMSI value for transmitting physical uplink control channel (PUCCH) communications;
       transmit downlink control information (DCI) that indicates a control channel element (CCE) index and an acknowledgment resource indicator (ARI) value, the CCE index and the ARI value indicating, to at least one of the one or more UEs, an RB index from the set of RB indices and a cyclic shift index from the set of cyclic shift indices associated with a PUCCH resource for transmitting a PUCCH communication; and
       receive, from the at least one UE, the PUCCH communication via the PUCCH resource.

14. The base station of claim 13, wherein the transmission of the RMSI value and the DCI is performed prior to establishing a radio resource control (RRC) connection with the at least one UE.

15. The base station of claim 13, wherein the code, when executed by the processor, is further configured to cause the processor to use a fixed orthogonal cover code (OCC) with the PUCCH resource.

16. The base station of claim 13, wherein the RB index is further associated with a duration or a frequency hop.

* * * * *